(12) United States Patent
Kanda et al.

(10) Patent No.: US 7,822,545 B2
(45) Date of Patent: Oct. 26, 2010

(54) MOBILE TERMINAL WITH NAVIGATION FUNCTION

(75) Inventors: Atsuhiko Kanda, Nishinomiya (JP); Ryo Fukazawa, Takatsuki (JP)

(73) Assignee: Kyocera Corporation, Kyoto (JP)

( * ) Notice: Subject to any disclaimer, the term of this patent is extended or adjusted under 35 U.S.C. 154(b) by 427 days.

(21) Appl. No.: 11/261,930

(22) Filed: Oct. 31, 2005

(65) Prior Publication Data

US 2006/0155466 A1    Jul. 13, 2006

(30) Foreign Application Priority Data

Jan. 12, 2005    (JP) ................. 2005-004985

(51) Int. Cl.
*G01C 21/30* (2006.01)

(52) U.S. Cl. .............. 701/209; 701/202; 340/995.19; 348/113

(58) Field of Classification Search ............. 701/202, 701/209; 340/995.19; 348/113
See application file for complete search history.

(56) References Cited

U.S. PATENT DOCUMENTS

| | | | | |
|---|---|---|---|---|
| 6,125,326 | A * | 9/2000 | Ohmura et al. | 701/213 |
| 6,222,583 | B1 * | 4/2001 | Matsumura et al. | 348/113 |
| 7,119,831 | B2 * | 10/2006 | Ohto et al. | 348/135 |
| 7,130,742 | B2 * | 10/2006 | Kobuya et al. | 701/207 |
| 2003/0095182 | A1 * | 5/2003 | Imoto | 348/148 |
| 2004/0046779 | A1 * | 3/2004 | Asano et al. | 345/716 |
| 2004/0236506 | A1 * | 11/2004 | Kolb et al. | 701/208 |
| 2007/0276596 | A1 * | 11/2007 | Solomon et al. | 701/211 |

FOREIGN PATENT DOCUMENTS

| | | |
|---|---|---|
| JP | 2000-149193 | 5/2000 |
| JP | 2001-005994 | 1/2001 |
| JP | 2003-111128 | 4/2003 |
| JP | 2003-214888 | 7/2003 |

* cited by examiner

*Primary Examiner*—Mark Hellner
*Assistant Examiner*—Helal A Algahaim
(74) *Attorney, Agent, or Firm*—Morrison & Foerster LLP

(57) ABSTRACT

The present invention provides a mobile terminal with navigation function which is able to display traveling directions on a photographed picture displayed on the display. The mobile terminal with navigation function of the present invention detects the present location of the cellular phone, detects the direction of the camera, sets the destination, receives the route information from present location to the destination from the server based on the destination and present location, calculates the traveling direction on the photographed picture based on the route information and direction of the camera and adds the traveling direction onto the photographed picture displayed on the display.

10 Claims, 6 Drawing Sheets

MOBILE TERMINAL WITH NAVIGATION FUNCTION

CROSS REFERENCE TO RELATED APPLICATIONS

This application is based upon and claims priority of Japanese Patent Application No. 2005-004985, the contents of which are incorporated herein by reference.

BACKGROUND OF THE INVENTION

1. Field of the Invention

The present invention relates to a mobile terminal with navigation function.

2. Description of the Related Art

A navigation device generally provides a route guidance utilizing a digital map representing a road map. Further, a navigation device displaying received real pictures from an information center has been developed.

However, a mobile terminal displaying a picture photographed by the camera of the mobile terminal on a display in real-time, the navigation device displaying traveling directions on the photographed picture being displayed on the display, has not been developed. (Refer to Japanese Tokkai-Hei 11-160080, Tokkai-Hei 9-126787, Tokkai-Hei 9-179491 and Tokkka-Hei 10-47978).

SUMMARY OF THE INVENTION

An object of the present invention is to provide a mobile terminal with navigation function which is able to display traveling directions on a photographed picture displaying on the display, the mobile terminal displaying a picture photographed by a camera of the mobile terminal on the display in real-time.

In order to solve the above problem, the preferred embodiment of the invention comprises following: a first detecting means for detecting a present location of the mobile terminal, a second detecting means for detecting a direction of a camera, a setting means for setting a destination, a receiving means for receiving a route information from the present location to the destination from the server based on the destination and the present location, a calculating means for calculating a traveling direction on photographed picture based on the information and the direction of the camera, and a display means for displaying an indicator indicating the traveling direction on the photographed picture.

Moreover, another preferred embodiment of the invention comprises following: a first detecting means for detecting a present location of the mobile terminal, a second detecting means for detecting a direction of the camera, a memory for storing map data, a setting means for setting a destination, a first calculating means for calculating a route from the present location to the destination based on the destination, present location and the map data, a second calculating means for calculating a traveling direction on the photographed picture based on the route and the direction, and a display means for displaying an indicator indicating the traveling direction on the photographed picture.

In these configurations, another preferred embodiment provides an arrow used as the indicator indicating the traveling direction.

In these configurations, another preferred embodiment provides a bending arrow corresponding to the turning direction used as the arrow indicating the traveling direction if there is a change of the traveling direction within a predetermined distance from the present location.

Further, in these configurations, the mobile terminal comprises a third detecting means for detecting the angle of the camera to the horizontal plane, the display control means for adding the arrow on the photographed picture based on said angle and displaying the arrow corresponding to the angle of the ground in the photographed picture.

In accordance with the preferred embodiment of the invention, in the case of the mobile terminal displaying a picture photographed by the camera of the mobile terminal on the display in real-time, the mobile terminal with navigation function is able to display the traveling directions on the photographed picture displayed on the display. Moreover, in accordance with the preferred embodiment of the invention, it is not necessary to produce the digital map.

BRIEF DESCRIPTION OF THE DRAWINGS

The above and other objects and advantages of the present invention will become apparent and more readily appreciated from the following description of the preferred embodiments taken in conjunction with the accompanying drawings, of which.

DETAILED DESCRIPTION OF THE PREFERRED EMBODIMENTS

Figure 1:
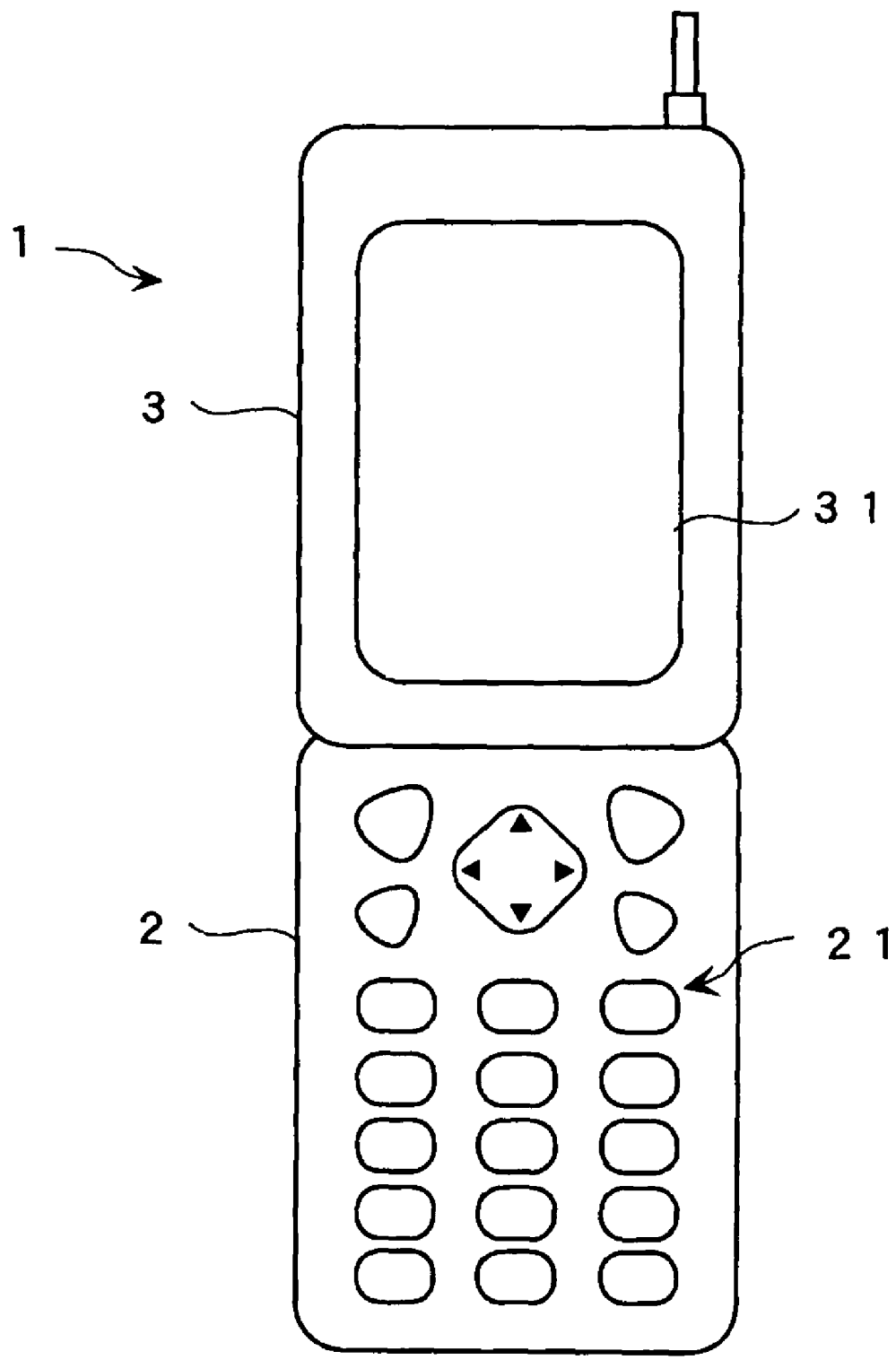
FIG. 1 illustrates an inside of the opened state of a cellular phone with the camera which is preferably used in accordance with embodiments of the present invention.

Reference will now be made in detail to the preferred embodiments of the present invention, examples of which are illustrated in the accompanying drawings, wherein like reference numerals refer to like elements throughout.

The preferred embodiment of the present invention is applied to a cellular phone with a camera that will be explained in accordance with the drawings.

Figure 2:
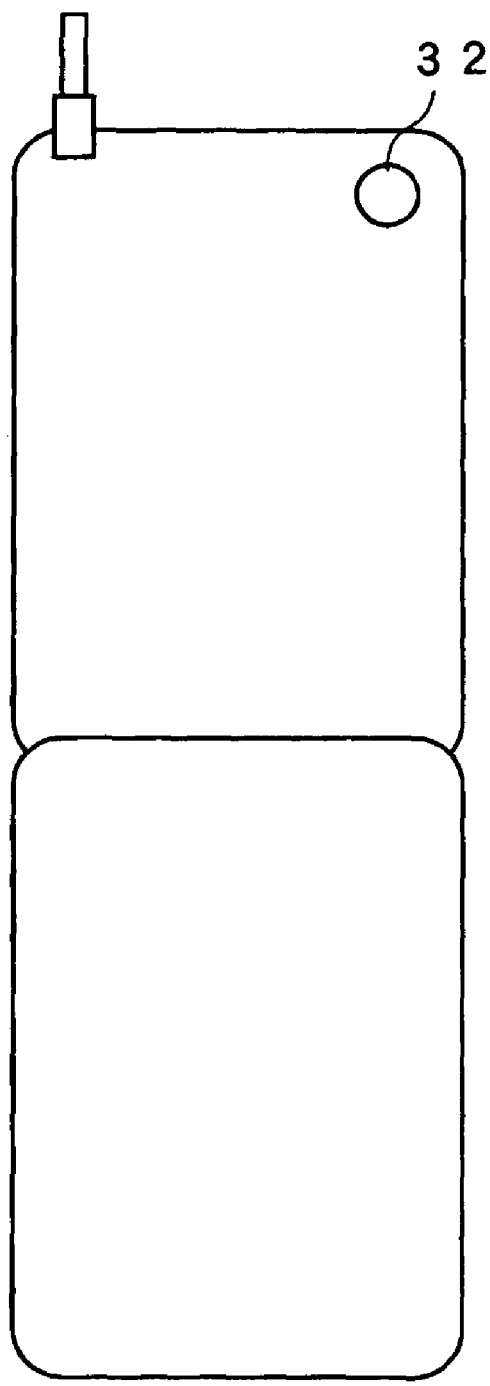
FIG. 2 illustrates an outside of the opened state of the cellular phone with the camera which is preferably used in accordance with embodiments of the present invention.

FIG. 1 and FIG. 2 show the external appearance of the cellular phone with the camera (hereafter called "cellular phone").

The cellular phone is foldable type. FIG. 1 and FIG. 2 show the opened state of the cellular phone. The cellular phone 1 has a main unit 2, a display section 3 is foldably fitted with the main unit 2. The inside surface of the cellular phone 1 has an operating section 21 having a plurality of keys. The inside surface of the display section 3 has a display 31. The outside surface of the display section 3 has a camera 32 which looks towards the outer direction.

Figure 3:
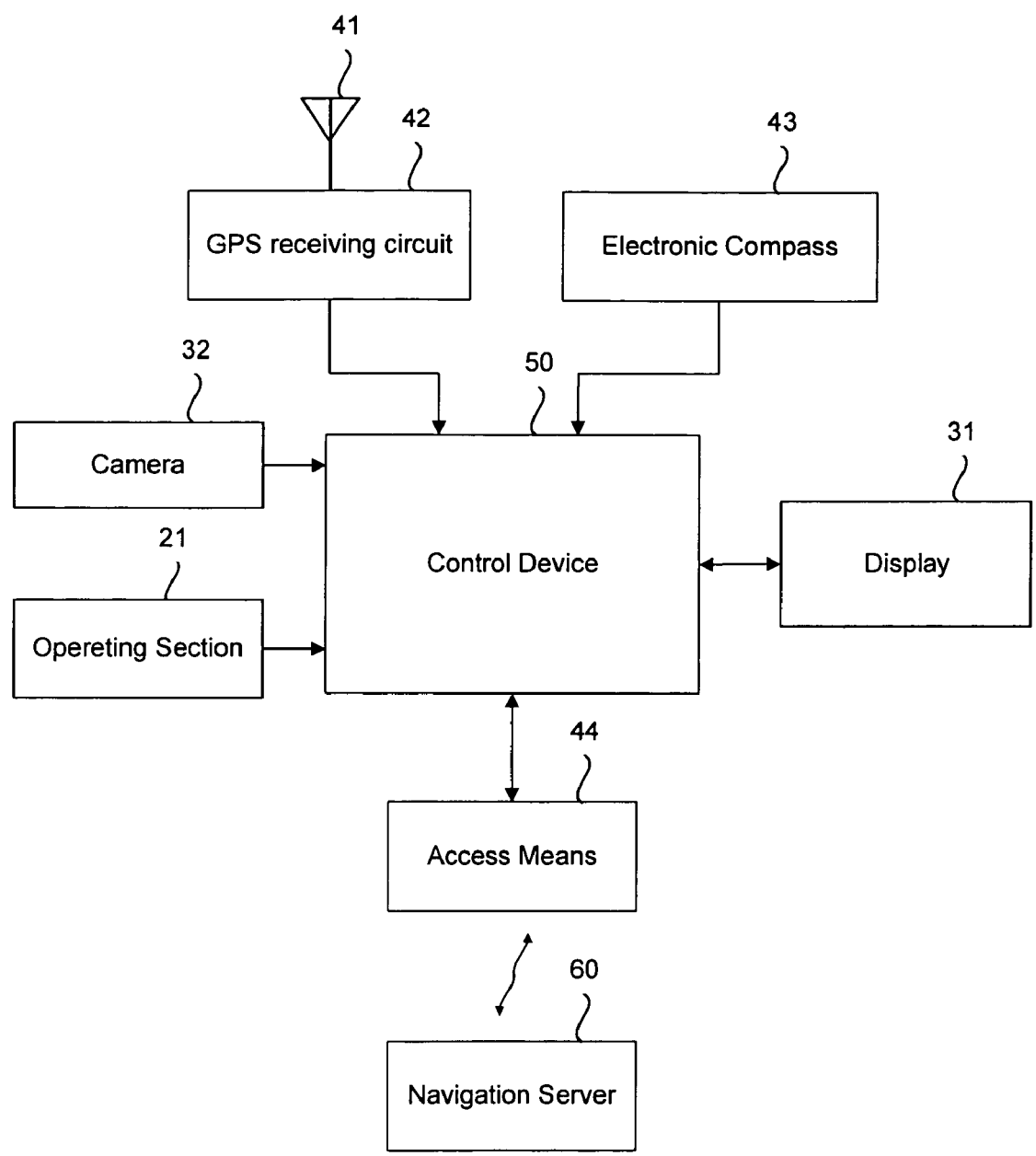
FIG. 3 is a function block diagram of the navigation device in the cellular phone which is preferably used in accordance with embodiments of the present invention.

FIG. 3 is a function block diagram of a navigation device which is incorporated the cellular phone 1.

In FIG. 3, symbol 21 is the operating section, symbol 31 is the display, symbol 32 is the camera. Symbol 41 is a GPS (Global Positioning System) antenna, symbol 42 is GPS receiving circuit. Symbol 43 is an electronic compass which detects the direction of the camera. Symbol 44 is an access means which communicating with a navigation server 60. Symbol 50 is a control device. The camera 32, the display 31, the operating section 21, the GPS receiving circuit 42, the electronic compass 43 and the access means 44 are respectively connected to the control device 50.

The destination is set by operating the operating section 21. The GPS receiving circuit 42 detects the present position of cellular phone 1. The electronic compass detects the direction of the camera 32.

The navigation function is started, then the control device 50 receives the present position of the cellular phone 1 from the GPS receiving circuit 42. The control device 50 transmits the present position information of the cellular phone 1 to the navigation server 60 via the access means 44 if the destination is set by the user. The navigation server 60 calculates the route from the present location to the destination if the navigation server 60 received the destination and the present location of the cellular phone. The navigation server 60 transmits map data from the present location to the destination and the data indicating the route to the cellular phone 1. The map data is sent by the navigation server 60 and the data indicating the route is received by the access means 44 and transmitted to the control device 50.

The control device 50 decides the traveling direction on the picture photographed by the camera 32 based on the map data received from the navigation server 60, the data indicating the route, the information of the present location of the cellular phone received from the GPS receiving circuit 42 and the direction of the camera 32 received from the electric compass 43.

In other words, the control device 50 recognizes the traveling direction from the present location based on the map data received from the navigation server 60, the data indicating the route and the present location of the cellular phone 1. The control device 50 recognizes the direction of the picture photographed by the camera 32 based on the direction of the camera detected by the electric compass 43. The control device 50 decides the traveling direction on the photographed picture based on the traveling direction from the present location and the direction of the photographed picture. Moreover, the control device 50 adds the indicator data indicating the traveling direction on the photographed picture to the photographed picture on the display 31. The control device 50 merges the traveling direction on the picture to the photographed picture by the camera 32. These operations are repeated within a predetermined period. Therefore, the indicator data indicating the traveling direction on the photographed picture is updated. The photographed picture by the camera 32 is updated in real-time. The three-dimensional arrow is used as the indicator data showing the traveling direction.

In the case that there is the corner within a predetermined distance from the present location on the route to destination, it is preferable that the arrow indicating the traveling direction on the photographed picture bends to correspond to the turning direction. Moreover, in the case that the destination is within a predetermined distance from the present location, a mark indicating the destination is displayed at the position corresponding to the destination.

Figure 4:
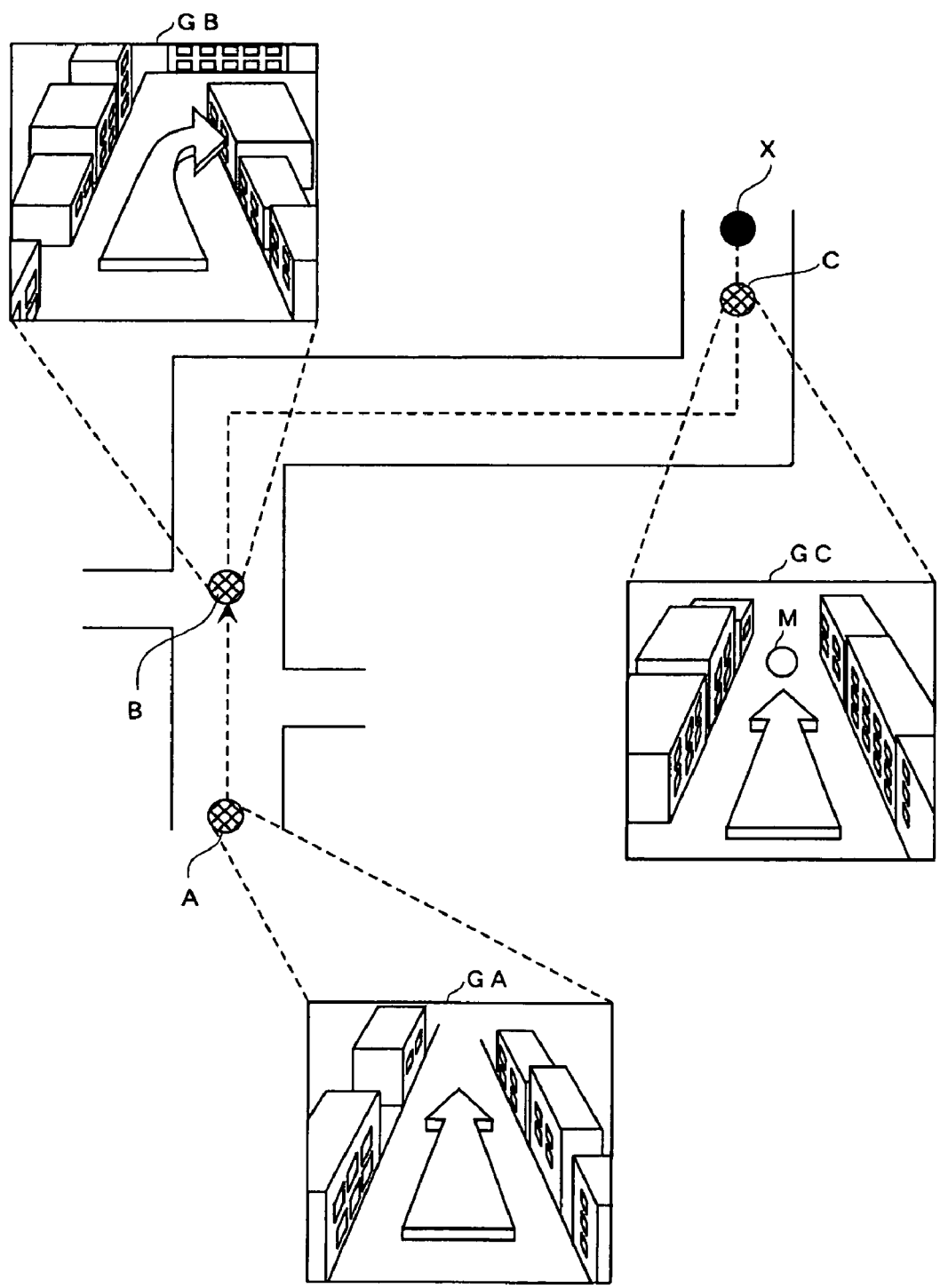
FIG. 4 is an illustration showing the route to destination X on the map data and the display of the cellular phone is displaying the image at A, B and C on the route.

FIG. 4 shows the route to the destination and the example of displayed pictures on the display 2 at the points A, B and C on the route. FIG. 4 shows the case where the direction of the camera 32 is the same with respect to the traveling direction.

The picture GA shows the display example displayed on the display 2 in the case that the present location is point A. The picture GB shows the display example displayed on the display 2 in the case that the present location is point B. In the picture GB, a bending arrow corresponding to the turning point is used as the arrow indicating the traveling direction because there is a corner within the predetermined distance from the present location on the route to the present location of the cellular phone 1. The picture GC shows the display example displayed on the display 2 in the case that the present location is point C. In the picture GC, the mark M indicating the destination is displayed because the present location of the cellular phone 1 is within the predetermined distance from the destination.

Figure 5:
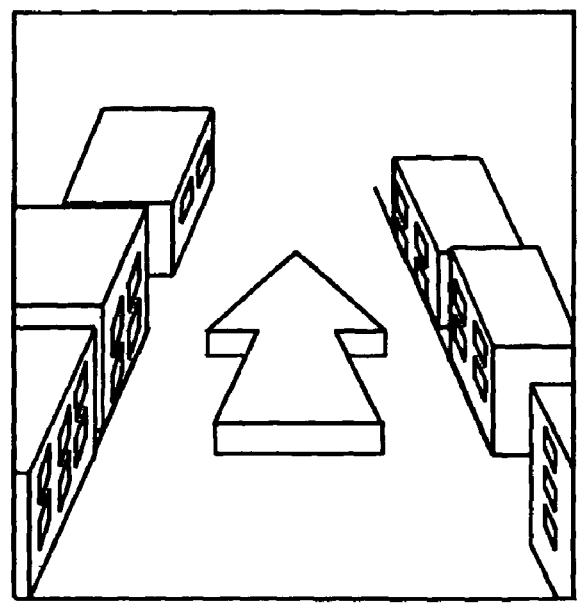
FIG. 5 is an illustration showing the three-dimensional arrow when the camera looks towards the horizontal direction.
Figure 6:
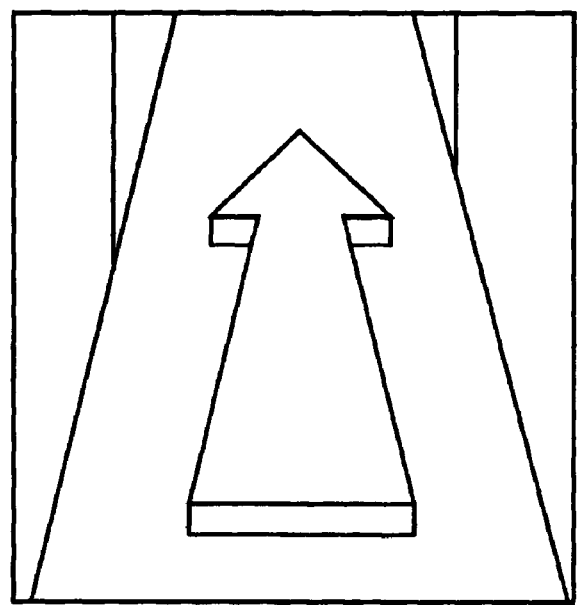
FIG. 6 is an illustration showing the three-dimensional arrow when the camera looks downward towards the horizontal plane.

The angle of the camera 32 to the horizontal plane is detected by the gyroscopic stabilizer or the angular rate sensor, then the display configuration of the arrow indicating the traveling direction may change according to the detected angle of the camera 32 to the horizontal plane. In particular, the three-dimensional arrow becomes parallel to the ground of the photographed picture displayed. For example, FIG. 5 shows the display when the camera 32 in the horizontal plane; that is, FIG. 5 shows an example of the three-dimensional arrow when the camera 32 faces the horizontal direction. FIG. 6 shows an example of the three-dimensional arrow when the camera 32 faces downward towards the horizontal plane.

In the embodiment above, the calculation of the route from the present location to the destination is conducted by the navigation server 60, but the control device 50 of the cellular phone 1 may calculate the route from the present location to the destination. In this case, the cellular phone 1 has a storing means storing the map data instead of the access means 44. Nonvolatile memory, a removable disk, etc. is used as the storing means. The control device 50 receives the map data from the present location to the destination from the storing means, then the control device 50 calculates the route from the present location to the destination based on the received map data.

In the embodiment above, the direction of the camera 32 is detected by the electric compass 43. But, the moving direction of the cellular phone 1 may instead be calculated based on the present location information at a time point and comparing this present location information with location information from a different time point. The direction of the camera 32 may then be the calculated based on moving direction of the cellular phone 1.

Figure 7:
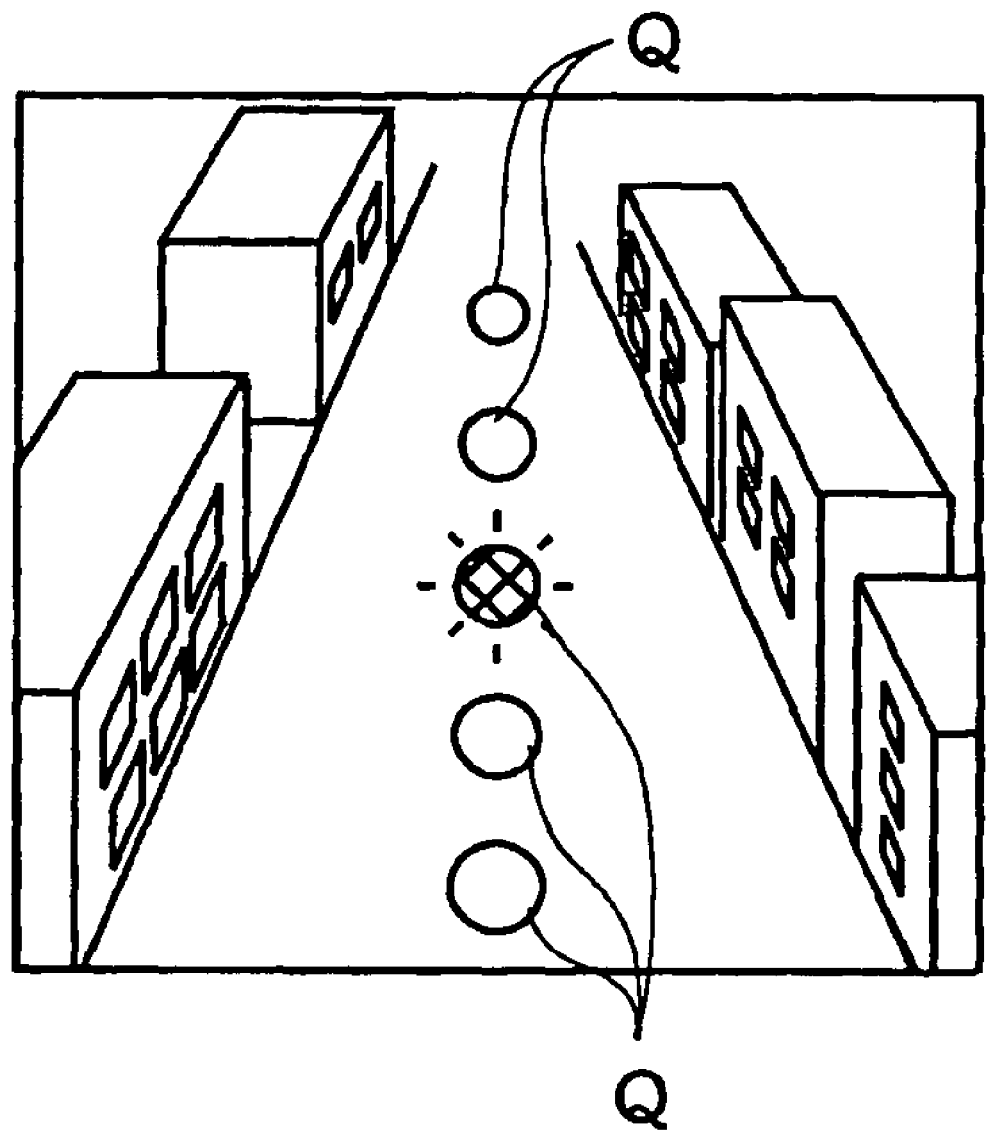
FIG. 7 is an illustration showing another example of display of the traveling direction.

In the embodiment above, the indicator showing the traveling direction is an arrow, but the indicator may be an indicator other than an arrow. For example, FIG. 7 shows some blinking marks Q displayed with some interval in the traveling direction. The blinking of these marks may shift in sequence in the traveling direction.

Although a few preferred embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A mobile terminal having a navigation function, comprising:
    a camera;

a display configured to display a picture photographed by the camera;

a first detector configured to detect a present location of the mobile terminal, a second detector configured to detect a direction of said camera, an operating section configured to set a destination selected by a user of the mobile terminal, an access section configured to receive route information from said present location to said destination from a server based on said destination and said present location, a calculator section configured to calculate a traveling direction based on said route information and said direction of the camera, and a controller configured to control said display to display an indicator indicating said traveling direction on the picture photographed by the camera, and if said destination is shown in the picture photographed by the camera, the controller is further configured to control said display to display a mark indicating said destination on the picture photographed by the camera at a position corresponding to said destination.

2. A mobile terminal having a navigation function comprising:

a camera;

a display configured to display a picture photographed by the camera;

a first detector configured to detect a present location of said mobile terminal, a second detector configured to detect a direction of the camera, a memory for storing map data, an operating section configured to set a destination selected by a user of the mobile terminal, a first calculator section configured to calculate a route from said present location to said destination based on said destination, said present location and said map data, a second calculator section configured to calculate a traveling direction based on said route and said direction of the camera, and a controller configured to control said display to display an indicator indicating said traveling direction on the picture photographed by the camera, and if said destination is shown in the picture photographed by the camera, the controller is further configured to control said display to display a mark indicating said destination on the picture photographed by the camera at a position corresponding to said destination.

3. The mobile terminal having the navigation function according to claim 1 or 2, wherein an arrow is used as said indicator indicating the traveling direction.

4. The mobile terminal having the navigation function according to claim 3, wherein a bending arrow corresponding to a turning direction is used as the arrow indicating the traveling direction if there is a change of the traveling direction within a predetermined distance from the present location.

5. The mobile terminal having the navigation function according to claim 3, further comprising:

a third detector configured to detect an angle of the camera to a horizontal plane, a display adjuster configured to adjust said arrow corresponding to an angle of a ground in the picture photographed by the camera.

6. The mobile terminal having the navigation function according to claim 4, further comprising a third detector configured to detect an angle of the camera to a horizontal plane, an arrow display angle controller configured to control said arrow corresponding to an angle of a ground in the picture photographed by the camera.

7. A method for displaying on a display of a mobile terminal travelling directions on a picture photographed by a camera of the mobile device, the method comprising:

a) detecting a present location of the mobile terminal, b) detecting a direction of said camera, c) receiving a user selection of a destination, d) receiving route information from said present location to said destination from a server based on said destination and said present location, e) calculating a traveling direction based on said route information and said direction of the camera; and f) displaying an indicator indicating said traveling direction on the picture photographed by the camera, and if said destination is shown on the picture, displaying a mark indicating said destination on the picture photographed by the camera at a position corresponding to said destination.

8. The mobile terminal having the navigation function according to claim 1, wherein the mark indicating said destination is displayed on the picture photographed by the camera when said destination is within a predetermined distance from said present location.

9. The mobile terminal having the navigation function according to claim 2, wherein the mark indicating said destination is displayed on the picture photographed by the camera when said destination is within a predetermined distance from said present location.

10. The control method of a displaying mobile terminal according to claim 7, wherein the displaying includes displaying the mark indicating said destination on the picture photographed by the camera when said destination is within a predetermined distance from said present location.

* * * * *